United States Patent [19]
Putsch et al.

[11] Patent Number: 5,634,689
[45] Date of Patent: Jun. 3, 1997

[54] ARTICULATED FITTING FOR SEATS WITH ADJUSTABLE BACKREST, IN PARTICULAR MOTOR VEHICLE SEATS

[75] Inventors: Peter-Ulrich Putsch, Rockenhausen; Hans-Karl Stanger, Puettlingen; Dirk Angermann, Cologne; Gregor Vossmann, Vreden; Heinz Voss, Leverkusen; Ulrich Lehmann, Alfter-Bonn, all of Germany

[73] Assignee: Keiper Recaro GmbH & Co., Germany

[21] Appl. No.: 346,467

[22] Filed: Nov. 29, 1994

[30] Foreign Application Priority Data

Nov. 30, 1993 [DE] Germany .................... 43 40 697.1

[51] Int. Cl.⁶ .................................................... B60N 2/02
[52] U.S. Cl. ........................................ 297/362; 475/162
[58] Field of Search ............................ 297/362; 475/162

[56] References Cited

U.S. PATENT DOCUMENTS

| | | | |
|---|---|---|---|
| 4,371,207 | 2/1983 | Wilking et al. | 297/362 X |
| 4,439,053 | 3/1984 | Pelz | 297/362 X |
| 4,469,375 | 9/1984 | Boyer | 297/362 |
| 4,827,800 | 5/1989 | Pedersen et al. | 475/162 |
| 5,090,771 | 2/1992 | Kawakita | 297/362 |
| 5,154,475 | 10/1992 | Kafitz | 297/362 |
| 5,277,672 | 1/1994 | Droulon et al. | 475/162 X |
| 5,312,158 | 5/1994 | Wittig et al. | 297/362 |
| 5,438,732 | 8/1995 | Engels et al. | 297/362 X |

*Primary Examiner*—Peter M. Cuomo
*Assistant Examiner*—Stephen Vu
*Attorney, Agent, or Firm*—McAulay Fisher Nissen Goldberg & Kiel, LLP

[57] ABSTRACT

Articulated fitting for seats having an adjustable backrest, in particular motor vehicle seats. The articulated fitting has an articulated part which is stationary with respect to the seat part and a swivelable articulated part associated with the backrest, these articulated parts being connected with one another via a swivel axle. The position of the two articulated parts relative to one another is determined by an adjusting and fixing device constructed as a gear unit. The swivel axle has an eccentric portion which is formed by two wedge segments which embrace a driver of the swivel axle, by a driver arm engaging between the narrow sides of the wedge segments, by an energy accumulator which presses apart the wide sides of the wedge segments and possibly by a centering segment arranged adjacent to the latter. The swivel axle has a central receptacle serving to connect with a transmission rod so as to be fixed with respect to rotation relative thereto. In order to achieve a reduction in structural component parts and an angular movability between the swivel axles of the articulated fittings on both sides and the transmission rod so as to compensate for alignment defects, the driver is constructed as a bushing which is connected with the driver arm integrated in the driver and with a cover disk covering the outer side of the articulated region and has a torque-transmitting receptacle for the transmission rod, this receptacle being constructed as a conical bore hole.

10 Claims, 4 Drawing Sheets

ARTICULATED FITTING FOR SEATS WITH ADJUSTABLE BACKREST, IN PARTICULAR MOTOR VEHICLE SEATS

BACKGROUND OF THE INVENTION a) Field of the Invention

The present invention is directed to an articulated fitting for seats with an adjustable backrest, in particular motor vehicle seats, in which a stationary articulated part associated with the seat part and a swivelable articulated part associated with the backrest are connected with one another via a swivel axle. An adjusting and fixing device is provided which determines the position of both articulated parts relative to one another and is constructed as a gear unit. The swivel axle has an eccentric portion for supporting one articulated part. This eccentric portion is formed by two wedge segments which embrace a portion of a driver of the swivel axle and are inclined relative to one another, by a driver arm engaging between the narrow sides of the wedge segments, and by an energy accumulator which presses apart the wide sides of the wedge segments. The swivel axle of each articulated fitting has a central receptacle serving to connect with a transmission rod so as to be fixed with respect to rotation relative thereto, which transmission rod couples the two articulated fittings of a seat with one another.

b) Description of the Related Art

DE 30 13 304 C2 describes an articulated fitting of the type mentioned above in which the driver for the wedge segments is constructed as a disk and is connected with the swivel axle portion so as to be fixed with respect to rotation relative thereto, e.g., by means of a press fit, shrink fit or the like. The disk-shaped driver can have integrally formed driver projections. Such a construction of a disk-shaped driver is not easy to manufacture due to the radial jump in the region of the driver projections. However, forming the driver projections as pins, stop cams or the like secured to the driver disk requires separate structural component parts which are rigidly connected with the driver disk. In order to transmit torque from the articulated fitting arranged on one longitudinal side of the seat to the articulated fitting arranged on the opposite longitudinal side of the seat, a transmission rod is provided which engages in a non-circular recess of the swivel axle and accordingly couples the swivel axles of the two articulated fittings. However, this requires that the centers of the swivel axle portions having the recesses for the transmission rods be exactly aligned in order to prevent the occurrence of constraining forces during adjustment. This necessitates a tedious and costly assembly process.

Moreover, DE 39 41 215 A1 discloses another articulated fitting of the type mentioned above in which a centering segment is arranged adjacent to the wedge segments to improve the running properties of the articulated fitting and reduce wear during the adjustment phase. Further, an embodiment example of this articulated fitting of the prior art set forth in DE 39 41 215 A1 shows a driver which is arranged laterally adjacent to the swivel axle formed by a bearing bush and engages by its driver arm between the wedge segments supported on the bearing bush on the one hand and the centering segment on the other hand. The driver and bearing bush presented in this solution are also separate structural component parts which must be coupled with a transmission rod and supported thereon. In this solution, it is also necessary for the swivel axles of the articulated fittings arranged on both longitudinal sides of the seat to be exactly aligned with one another to prevent constraining forces during the adjustment phase.

OBJECT AND SUMMARY OF THE INVENTION

The primary object of the present invention is to improve an articulated fitting of the type mentioned above so as to enable a reduction of structural component parts and at the same time prevent lacquer and dust from entering the gearing region and prevent the escape of grease from the gearing region.

This object is met according to the invention in that the driver is constructed as a bushing which is connected with the driver arm integrated in the driver so as to form one part and is connected with a cover disk covering the outer side of the articulated region, the torque-transmitting receptacle for the transmission rod being provided in the center of the bushing. Manufacturing and assembly problems are substantially eliminated in that the driver, as the bushing which receives the transmission rod and is connected with the driver arm and a cover disk, can be constructed as an integrated structural component part, e.g. of plastic or die-cast magnesium, aluminum or zinc.

According to a preferred embodiment form of the invention, the receptacle is constructed as a conical bore hole with a conical surface area widening slightly toward the inside of the seat so as to enable angular movability between the swivel axles on the one hand and the transmission rod on the other hand in order to compensate for manufacturing tolerances. The construction of the receptacle as a conical bore hole for coupling the transmission rod with the driver so as to be fixed with respect to rotation relative to it ensures a joint-like or articulated operation which compensates for alignment errors. By constructing the driver arm as a ring-segment projection which projects from a wedge-segment contact surface, the axial position of the wedge segments can also be secured by means of the wedge-segment contact surface of the driver.

A region covering commonly occurring alignment errors can be achieved in that the conical outer surface area of the conical bore hole has a slope of up to approximately 3 degrees. The conical bore hole is advantageously constructed as a spline shaft profile in order to transmit a sufficient adjusting moment or controlling torque.

Although the articulated fitting can be reliably held together axially by means of a resilient retaining ring which is supported on the end of the bushing of the driver opposite the cover disk, the articulated fitting is secured axially in another embodiment of the invention in that the free end of the bushing of the driver opposite the cover disk engages behind the articulated part supported on the bushing by means of locking projections which are arranged at the outer circumference of clamping fingers of the bushing which are separated by radial slots. In addition, an annular spring member may be arranged between the locking projections and the outside of the articulated part supported on the bushing in order to compensate for axial tolerances. This annular spring member can be formed, e.g., from two rings which are arranged at a distance from one another and are connected with one another by spring legs which are uniformly distributed around their circumference.

In a modification of the solution described above, the articulated fitting can also be secured axially by at least two opposite holding or retaining fingers which project out of the outer circumference of the hub located opposite the cover disk and can be swiveled into recesses in the hub. The retaining fingers can be integrally formed on the hub in such a way that they spread apart in the working position. However, it is also possible to enlarge the inner diameter of the hub in the region of the retaining fingers by an amount corresponding to their deflecting movement and to construct the retaining fingers with a trapezoidal cross section.

Although the cover disk can be integrally formed on the hub so as to form one part with it, it is advantageous to construct the cover disk in two parts since the hub body must be made from a hard work material for reasons of stability, while the upper portion of the cover disk should advantageously be made from a softer work material to improve sealing, prevent noise and avoid an increased actuating torque. Therefore, according to another design feature of the invention, the cover disk can be formed by an annular shoulder which comprehends the hub, wedge segments and driver arm and extends in the radial direction and by an annular disk which can be connected with the annular shoulder. The inner circumference of the annular disk advantageously has a clip groove for engaging the edge of the annular shoulder of the driver.

The invention is shown in the drawing with reference to an embodiment example and is explained more fully in the following.

DESCRIPTION OF THE PREFERRED EMBODIMENTS

Figure 1:
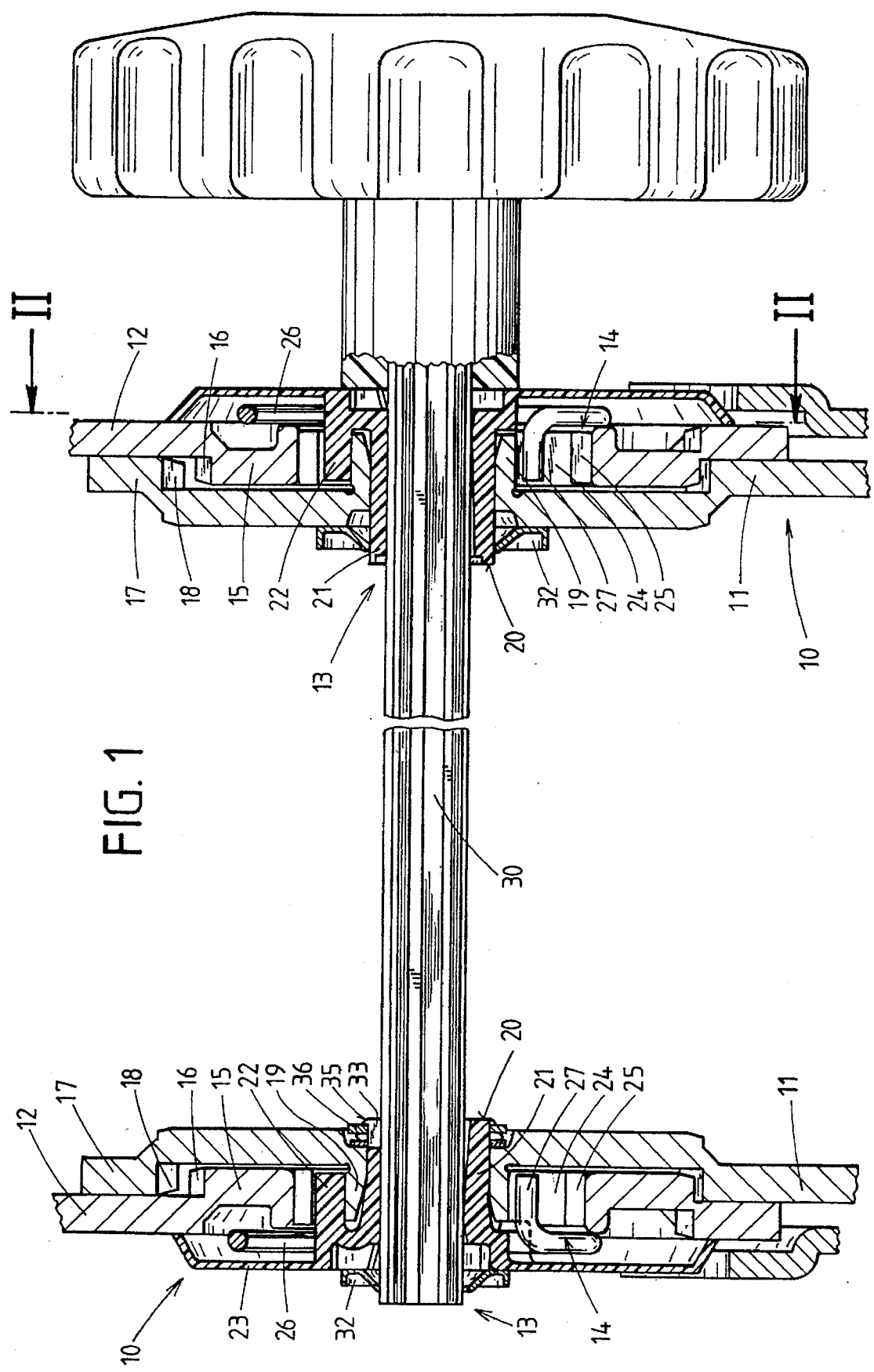
FIG. 1 is a view in longitudinal section of the two articulated fittings which are arranged on each longitudinal side of the seat and connected with one another by a transmission rod.
Figure 2:
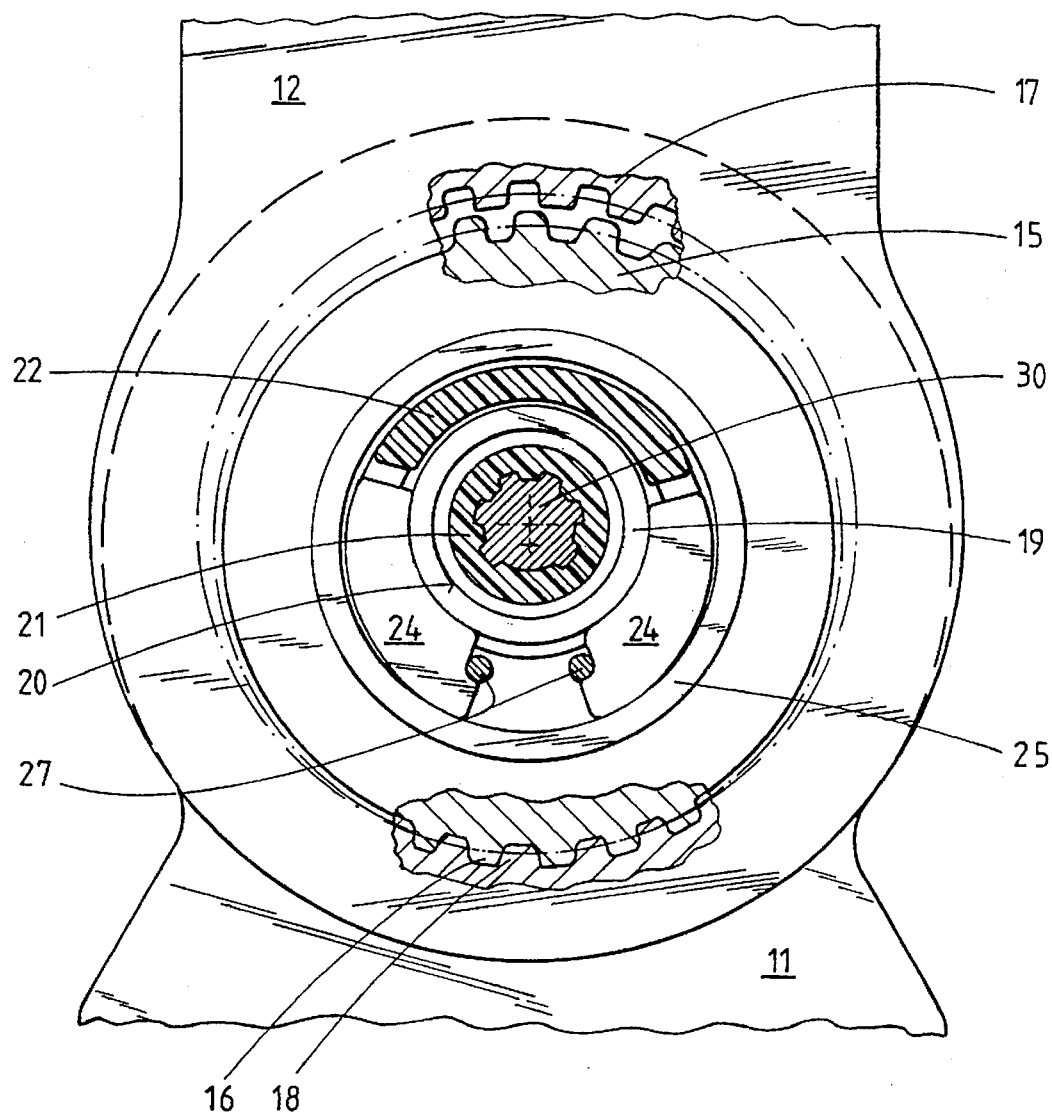
FIG. 2 shows a sectional view of an articulated fitting according to line II—II of FIG. 1.

The articulated fitting 10 which is arranged on both longitudinal sides of the seat and connects the seat part with the backrest has a stationary articulated part 11 which is connected with the seat part and an articulated part 12 which is connected with the backrest and is swivelable relative to the articulated part 11, these articulated parts 11, 12 being connected with one another by a swivel axle 13 comprising an eccentric portion 14. The swivel axle is also a component part of an adjusting and fixing device constructed as a gear unit. This adjusting and fixing device also comprises a spur gear 15 which is formed, e.g., by stamping out of the articulated part 12 and has an external toothing 16 which meshes with the internal toothing 18 of a gear rim 17 of the articulated part 11, which gear rim 17 can also be formed, for example, by stamping. The diameter of the outside circle of the external toothing 16 is smaller than the diameter of the base circle of the internal toothing 18 by at least the whole depth of a tooth. Accordingly, the difference in the number of teeth between the toothings 16 and 18 is at least one tooth, the internal toothing 18 having a greater number of teeth than the external toothing 16. The arrangement shown in the drawing is selected in such a way that the external toothing 16 can roll along the internal toothing 18.

The articulated part 11 has a drawn collar 19 disposed concentrically to its internal toothing 18, a driver 20 constructed as a bushing being supported therein. This driver 20, which is preferably formed in one piece from plastic, encloses a hub 21 which is rotatably supported by its outer surface area in the drawn collar 19 of the articulated part 11. A driver arm 22 overlaps a portion of the drawn collar 19 and is arranged at a distance radially from the hub 21 and connected with the latter. Like the hub, this driver arm 22 passes into a cover disk 23 overlapping the articulated region at the outer side of the articulated fitting 10. Two wedge segments 24 are supported by their inner surfaces in the plane of the driver arm 22 at the drawn collar 19 and their outer surface area contacts a bearing ring 25 which is secured in the spur gear 15 of the articulated part 12. While the narrow end sides of the wedge segments 24 are located at a slight distance from the driver arm 22 in the stationary position of the articulated fitting, the wide end sides of the wedge segments 24 are acted upon by the spring legs 27 of an annular spring 26 so as to spread apart. Together with the drawn collar 19 of the articulated part 11, these wedge segments 24 produce an eccentric portion which causes the toothing 16 of the spur gear 15 to be pressed into the toothing 18 of the internal gear rim of the articulated part 11 in a lengthening of the maximum point of the eccentric. Contact surfaces 28 are integrally formed on the driver 20 in the region of the wedge segments 24 adjacent to the cover disk 23 on either side of the hub 21 and have wedge-segment-like profiles adjoining the driver arm 22 which projects opposite these contact surfaces 28.

In its center, the hub 21 of the driver has a continuous receptacle 29 which is constructed as a conical bore hole and has a conical outer surface area which widens slightly toward the inside of the seat with its minimum diameter located at the side adjacent to the cover disk 23. In the present embodiment example, for the purpose of transmitting torque, this conical bore hole 29 is designed as a modified spline shaft profile, the transmission rod 30, which also has a modified spline shaft profile, fitting into this modified spline shaft profile. The conical bore hole 29 serving to receive the transmission rod 30 has a conical surface area 31 whose slope can amount to as much as approximately 3 degrees relative to the axial center of the conical bore hole 29. In this way, alignment errors in the axial centers of the two articulated fittings located opposite one another can be compensated for, since an articulated or joint-type operation is effected within narrow but sufficient limits during the adjusting movement of the two articulated fittings so that the connection between the driver 20 and the transmission rod 30 remains substantially free of constraining forces.

In the embodiment example shown in FIG. 1, the articulated fitting shown on the right-hand side is held together axially by an inherently resilient retaining washer 32. The articulated fitting shown on the left-hand side of FIG. 1 is likewise secured axially by an inherently resilient retaining washer 32 arranged on the left side and supported at the transmission rod 30. On the other side of this articulated fitting, the free end of the hub 21 of the driver 20 located opposite the cover disk 23 is provided with clamping fingers 33 which—as can be seen in particular from FIGS. 3 and 4—are formed by the radial slots dividing the circumference of the end of the hub and by locking projections 35 which project out radially at the free end. On one side, these locking projections 35 engage behind an annular spring member 36 which contacts the outer side of the drawn collar 19 of the articulated part 11 on the other side. This annular spring member 36 may be formed, e.g., by two annular disks which are arranged at a distance from one another with blade-like leaf spring webs interposed between them. The use of such an annular spring member 36 is advantageous insofar as it can absorb the slight axial deflecting movements within the articulated fitting which may occur as a result of manufacturing tolerances and can lead to alignment errors.

Figure 3:
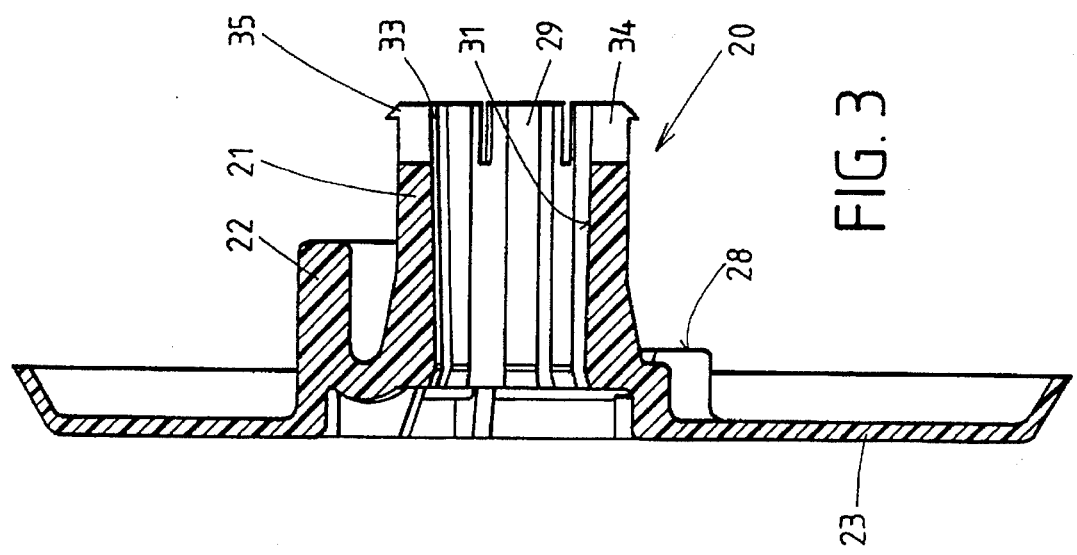
FIG. 3 is a view in section and in enlarged scale with reference to FIG. 1 showing a driver which can be coupled with the transmission rod so as to be fixed with respect to rotation relative to it.
Figure 4:
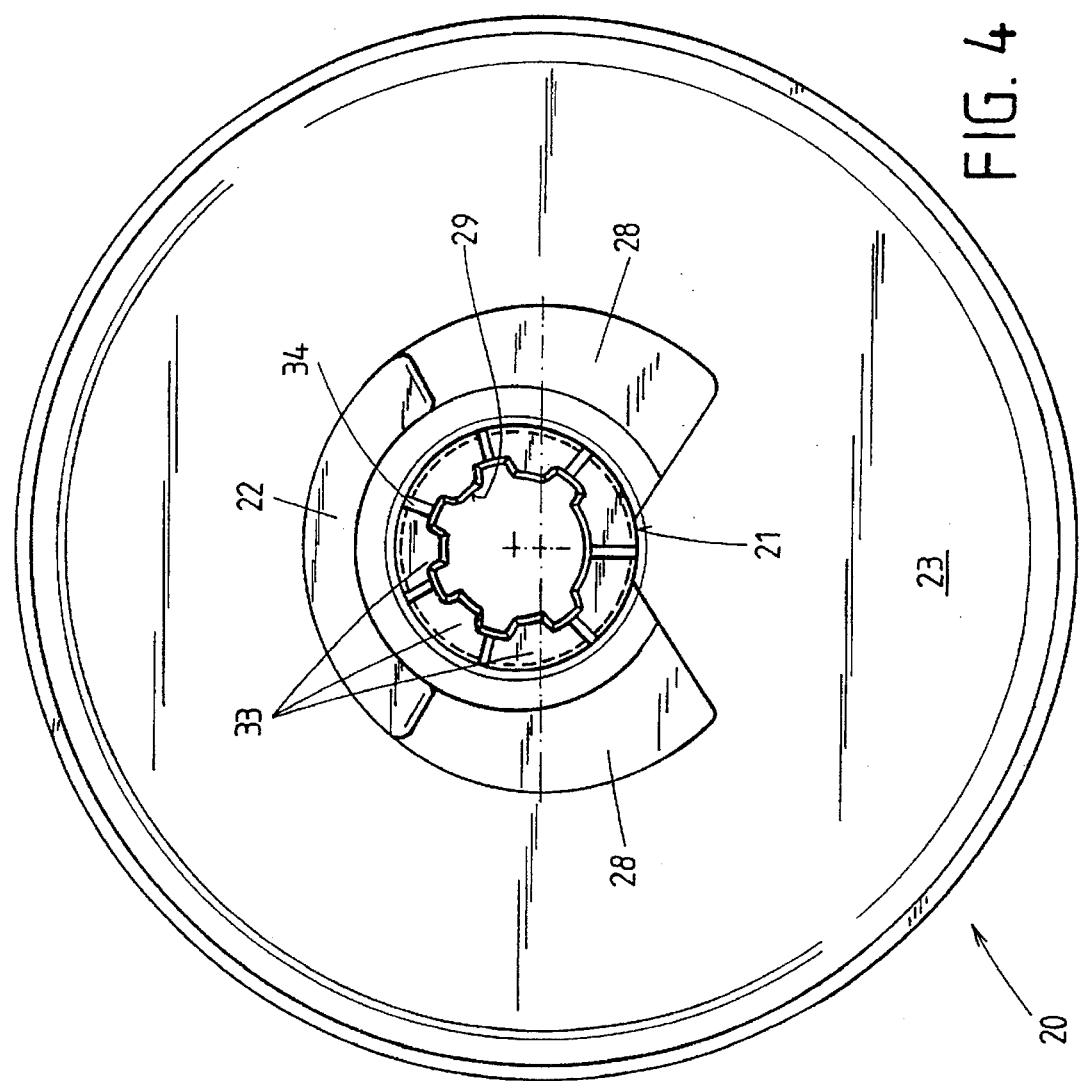
FIG. 4 is a view of the driver shown in FIG. 3 showing the inside of the driver having the driver arm.
Figures 6, 7:
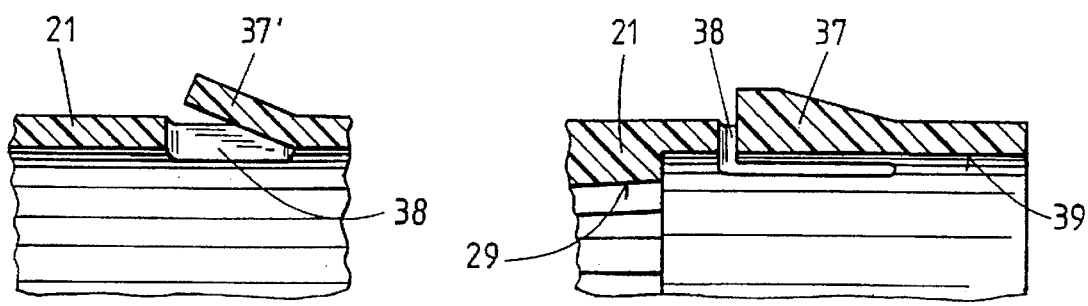
FIG. 6 show one of the retaining fingers shown in FIG. 5 in a section along line VI—VI of FIG. 5.
FIG. 7 shows an alternative construction of the retaining finger shown in FIG. 6.

As is shown in FIGS. 6 and 7, retaining fingers 37 can be used instead of the locking projections 35 shown in FIG. 3 to secure the articulated fitting axially, at least two of these retaining fingers 37 being arranged at the circumference of the hub 21 of the driver 20. The retaining fingers 37 are enclosed by a recess 38 in the outer surface area of the hub 21 so that the projecting portion of each retaining finger 37 can penetrate into the recess 38 when the drawn collar 19 of the articulated part 11 is slipped onto the hub 21 so as to snap in behind the articulated part 11. The retaining finger 37 shown in FIGS. 5 and 6 has a trapezoidal shape, its thickened region projecting beyond the outer surface area of the hub 21. In the region of its retaining finger, the diameter of the inner circumference 39 of the hub 21 is greater than the conical bore hole 29 so that the transmission rod 30 does not impede the deflecting movement of the retaining fingers.

In the embodiment example shown in FIG. 7, the retaining finger 37' is integrally formed on the hub 21 in such a way that its free end projects out of the recess 38 and projects out of the hub 21 by a thickness corresponding to the wall thickness of the hub 21.

Figure 5:
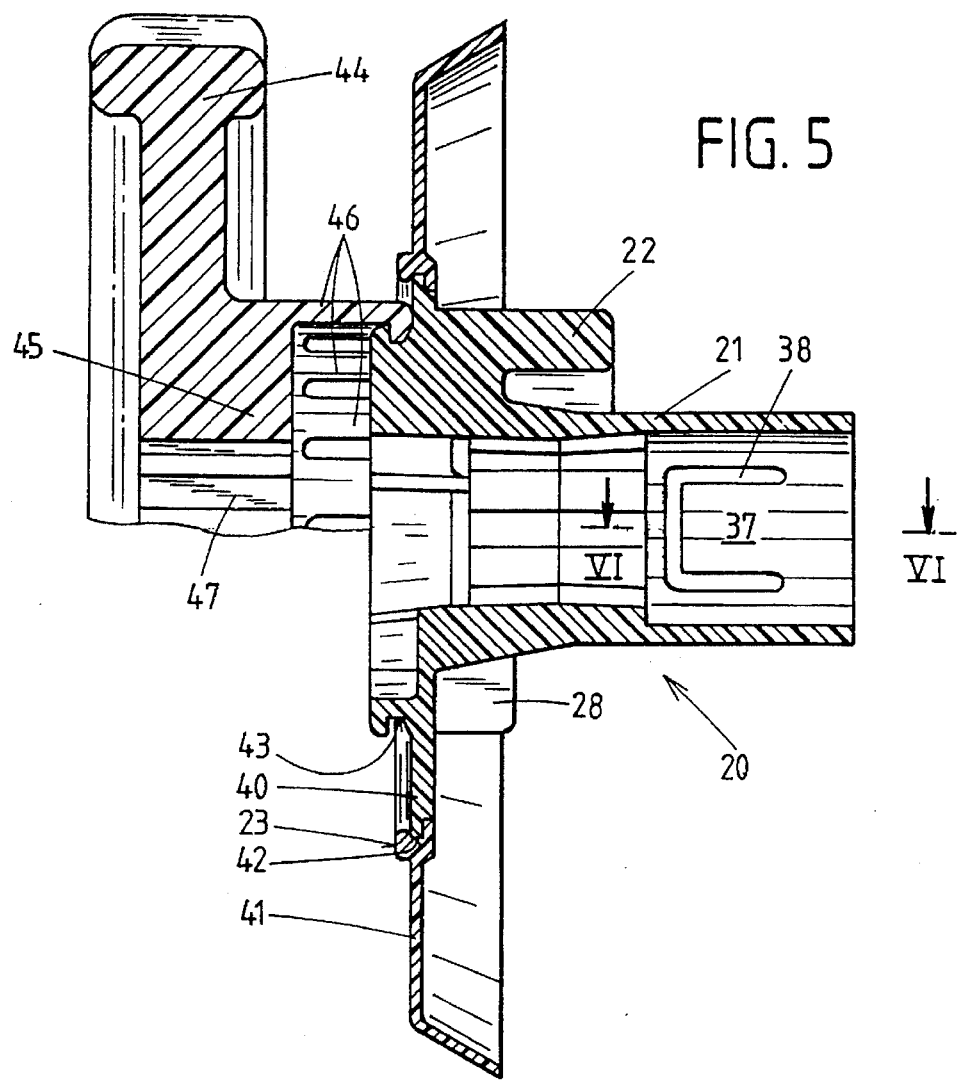
FIG. 5 shows a view of another embodiment example of a driver similar to the view shown in FIG. 3, the driver is constructed in two parts and is connected with a driving member in the form of a handwheel shown in half-section.

FIG. 5 shows another advantageous construction of the driver 20. The hub 21, its contact surfaces 28 and its driver arm 22 are enclosed by an annular shoulder 40 which is connected with an annular disk 41. The annular shoulder 40 and annular disk 41 form the cover disk 23. In order to secure the annular disk 41 on the annular shoulder 40, the inner circumference of the annular disk 41 is provided with a clip groove 42 which locks at the edge of the annular shoulder 40.

In the driver 20 according to FIG. 5, an annular groove 43 is provided at the hub portion of the driver 20 projecting in the axial direction relative to the cover disk 23. Locking fingers 46 which form a component part of a driving member which is connected with the transmission rod 30 so as to transmit torque can be clipped into the annular groove 43. In the embodiment example shown in FIG. 5, the driving member is formed by a handwheel 44, the locking fingers 46 being arranged on the hub 45 of this handwheel 44. These locking fingers 46 may be formed in one piece by injection molding when the handwheel 44 is manufactured from plastic. The hub itself has a driver bore hole 47 which is profiled so as to correspond to the transmission rod and serves for rotational driving, while the axial position of the handwheel is secured by the locking fingers 46.

As was already mentioned, the embodiment forms described and shown above are only examples illustrating the subject of the present invention which is in no way limited to these examples. Rather, there are many conceivable modifications and different constructions of the subject matter of the invention. In particular, all of the novel features mentioned in the description and/or shown in the drawings are substantial to the invention, even when not expressly claimed in the patent claims.

What is claimed is:

1. In an articulated fitting for seats having an adjustable backrest, in particular motor vehicle seats, in which a stationary articulated part associated with the seat part and a swivelable articulated part associated with the backrest are connected with one another via a swivel axle, wherein an adjusting and fixing device is provided which determines the position of both articulated parts relative to one another and is constructed as a gear unit and the swivel axle has an eccentric portion for supporting one articulated part, which eccentric portion is formed by two wedge segments which embrace a portion of a driver of the swivel axle and are inclined relative to one another, by a driver arm engaging between the narrow sides of the wedge segments, and by an energy accumulator which presses apart the wide sides of the wedge segments, wherein the swivel axle of said each articulated fitting has a central receptacle serving to connect with a transmission rod so as to be fixed with respect to rotation relative thereto, which said transmission rod couples the two articulated fittings of a seat with one another, said driver arm taking the form of a ring segment projecting between said wedge segments, said driver being constructed as a bushing having a center which is integrally connected with said driver arm integrated in the driver so as to form one part and is rigidly connected with a cover disk covering the outer side of the articulated region, a torque-transmitting receptacle for the transmission rod being provided in the center of the bushing.

2. The articulated fitting according to claim 1, wherein the receptacle is constructed as a conical bore hole with a conical surface area widening slightly toward the inside of the seat.

3. The articulated fitting according to claim 2, wherein the conical surface area of the conical bore hole has a slope of approximately 3 degrees.

4. The articulated fitting according to claim 2, wherein the conical surface area of the conical bore hole is designed as a spline shaft profile.

5. The articulated fitting according to claim 1, wherein a free end of the bushing of the driver opposite the cover disk engages behind the articulated part supported on the bushing by locking projections which are arranged at an outer circumference of clamping fingers of the bushing which are separated by radial slots.

6. The articulated fitting according to claim 5, wherein an annular spring member is arranged between the locking projections and the outside of the articulated part supported on the bushing.

7. The articulated fitting according to claim 1, wherein at least two opposite retaining fingers project out of an outer circumference of a hub located opposite the cover disk and can be swiveled into recesses in the hub in the inserting direction.

8. The articulated fitting according claim 7, wherein the cover disk can be formed by an annular shoulder which embraces the hub, said wedge segments and said driver arm and extends in the radial direction and by an annular disk which can be connected with the annular shoulder.

9. The articulated fitting according to claim 8, wherein an inner circumference of the annular disk has a clip groove for engaging the edge of the annular shoulder of the driver.

10. The articulated fitting according to claim 1, wherein an annular groove is provided at a hub portion of the driver projecting opposite the cover disk, said annular groove serving to receive a plurality of locking fingers which are arranged at a circumference of the hub of a handwheel to secure the handwheel in an axial position at the driver.

* * * * *